May 9, 1933.  A. GLASER  1,907,645
FRAME FOR BICYCLES OR MOTORCYCLES
Filed March 5, 1932
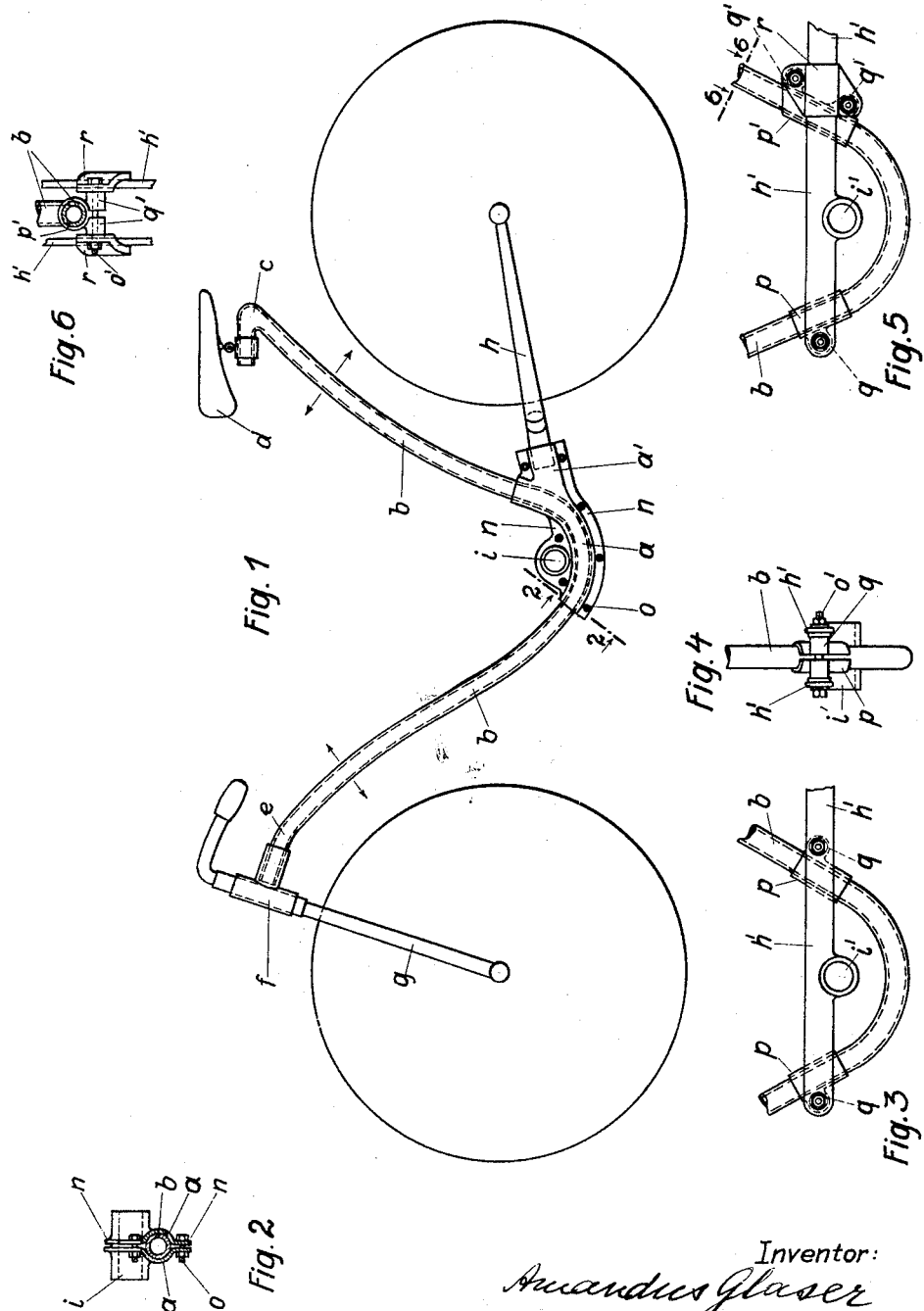

Patented May 9, 1933

1,907,645

UNITED STATES PATENT OFFICE

AMANDUS GLASER, OF BERLIN, GERMANY

FRAME FOR BICYCLES OR MOTORCYCLES

Application filed March 5, 1932, Serial No. 596,999, and in Germany September 10, 1931.

My invention relates to improvements in frames for bicycles or motorcycles. In bicycles or motor-cycles such as are now in use elastic means have been provided for taking up the shocks exerted on the wheels, such for example as coiled springs on which the saddle is supported. However, the space for providing such springs is small, and therefore only small springs can be provided which are not sufficiently effective. Further, the said springs are adapted to take up only the shocks resulting from the rear wheel, while the shocks resulting from the front wheel are elastically taken up only if special elastic means are provided for connecting the axis of the front wheel with the frame.

The object of the improvements is to provide a construction by means of which the shocks exerted on the rear wheel are effectively taken up, and by means of which also the shocks exerted on the front wheel are elastically taken up. Another object of the improvements is to provide a frame which is simple in construction. With these objects in view my invention consists in providing a frame which itself is sufficiently elastic to take up the said shocks. Preferably the frame consists of two elastic arms which are secured to a frame member in which the center spindle of the pedals revolves, and which are freely movable by elasticity at their outer ends, one of the said arms having the saddle mounted thereon, while the other one is secured to the socket of the steering column. Preferably the said arms are made from an integral spring pipe bent substantially into V-shape and clamped within the said frame member.

For the purpose of explaining the invention several examples embodying the same have been shown in the accompanying drawing in which the same reference characters have been used in all the views to indicate corresponding parts. In said drawing, Fig. 1 is an elevation showing a bicycle, the wheels being indicated in a diagrammatic way, Fig. 2 is a sectional view taken on the line 2—2 of Fig. 1, Fig. 3 is an elevation showing a modified construction of the joint connecting the frame with the rear wheel fork, Fig. 4 is a side elevation viewed from the left of Fig. 3, Fig. 5 is an elevation similar to the one illustrated in Fig. 3 and showing a modification, and Fig. 6 is a sectional view taken on the line 6—6 of Fig. 5.

In the example shown in Figs. 1 and 2 the frame of the bicycle comprises an elastic pipe $b$ bent substantially into V-shape and secured to a frame member $a$ comprising the socket $i$ for the center spindle of the pedals. In the example shown in Figs. 1 and 2 the frame member $a$ is composed of two sections formed with flanges $n$ and clamped together and on the bottom part of the frame $b$, $b$ by means of screws $o$. The frame member $a$ is provided with a rear extension $a'$ in which the rear wheel fork $h$ is fixed.

The rearwardly extending arm of the pipe $b$ is formed at its top end with a forwardly directed extension $c$, on which the saddle $d$ is mounted. The forwardly extending arm of the pipe $b$ is secured with its end portion $e$ to the socket $f$ of the steering column in which the front wheel fork $g$ supported on the front wheel is mounted.

By reason of their elasticity the arms of the pipe $b$ are adapted to be elastically bent in the direction of the arrows shown in Figure 1, and their length and elasticity are such that the shocks are effectively taken up.

In the modification shown in Figs. 3 and 4 the rear wheel fork $h^1$ is extended rearwardly across the bottom part of the frame member $b$, $b$ and it is screwed to slotted sleeves $p$, $p$ mounted on the said frame and made integral with sockets $q$, the arms $h'$, $h'$ and the sleeves $p, p$ being fixed in positions by screws $q$ clamping the said parts together. The socket $i'$ of the center spindle of the pedals is made in two sections each made integral with one of the arms of the rear wheel fork $h^1$.

The modification shown in Figs. 5 and 6 is similar to the one illustrated in Figs. 3 and 4, and similar letters of reference have been used to indicate corresponding parts. However, the arms of the rear wheel fork $h'$ are fixed in position by means of plates $r$ placed thereon and clamped to the sleeve $p'$. The sleeve $p'$ is formed with two sockets $q'$.

I claim:

1. A frame for bicycles or motor-cycles, comprising a frame member constructed for having the driving mechanism mounted thereon, arms made from elastic material secured to said frame member and extending respectively forwardly and rearwardly therefrom into positions for having the saddle and the steering head secured thereto, said arms being freely movable relatively to each other within the plane of the frame, and having an elasticity sufficient for taking up the weight of the rider and the shocks exerted on the wheels, and a rear wheel fork connected to said frame member.

2. A frame for bicycles or motor-cycles, comprising a frame member constructed for having the driving mechanism mounted thereon, a V-shaped integral member made from elastic material secured to said frame member and comprising arms extending respectively forwardly and rearwardly therefrom into positions for having the saddle and the steering head secured thereto, said arms being freely movable relatively to each other within the plane of the frame, and having an elasticity sufficient for taking up the weight of the rider and the shocks exerted on the wheels, and a rear wheel fork connected to said frame member.

3. A frame for bicycles or motor-cycles, comprising a frame member constructed for having the driving mechanism mounted thereon, elastic arms secured to said frame member and extending respectively forwardly and rearwardly therefrom into position for having the saddle and the steering head secured thereto, said arms being freely movable relatively to each other within the plane of the frame and having an elasticity sufficient for taking up the shocks exerted on the wheels, said frame member being composed of two plates clamped towards each other and on said arms, and a rear wheel fork connected to said frame member.

4. A frame for bicycles or motor-cycles, comprising a frame member constructed for having the driving mechanism mounted thereon, a V-shaped integral elastic member secured to said frame member and comprising arms extending respectively forwardly and rearwardly therefrom into positions for having the saddle and the steering head secured thereto, said arms being freely movable relatively to each other within the plane of the frame and having an elasticity sufficient for taking up the shocks exerted on the wheels, said frame member comprising two sleeves fixed to said arms, and a rear wheel fork connected to said sleeves.

5. A frame for bicycles or motor-cycles, comprising a frame member constructed for having the driving mechanism mounted thereon, a V-shaped integral pipe made from elastic material secured to said frame member and comprising arms extending respectively forwardly and rearwardly therefrom into positions for having the saddle and the steering head secured thereto, said arms being freely movable relatively to each other within the plane of the frame, and having an elasticity sufficient for taking up the weight of the rider and the shocks exerted on the wheels, and a rear wheel fork connected to said frame member.

6. A frame for bicycles or motor-cycles comprising a frame member constructed for having the driving mechanism mounted thereon, arms made of elastic material secured to said frame member and extending respectively forwardly and rearwardly therefrom into positions for having the saddle and the steering head secured thereto, said arms being freely movable relatively to each other within the plane of the frame, and having an elasticity sufficient for taking up the weight of the rider and the shocks exerted on the wheels, and a rear-wheel fork rigidly connected to said frame member.

7. A frame for bicycles and motor-cycles including a resilient frame member formed of a single continuous length of metal bent medially to V shape, at its ends engaging a steering head and a saddle and disposed with arms extending forwardly and rearwardly and by virtue of such disposition effective to sustain and absorb in substantial degree the shocks of travel under load, and a second frame member secured to the first adjacent the bend of the V thereof, the second frame member being adapted to afford bearing for the centre spindle of a pair of pedals.

8. A frame for bicycles and motor-cycles including a resilient frame member formed of a single continuous length of metal bent medially to V shape, at its ends engaging a steering head and a saddle and disposed with arms extending forwardly and rearwardly and by virtue of such disposition effective to sustain and absorb in substantial degree the shocks of travel under load, and a rear-wheel fork secured to the said frame member adjacent to the bend of the V thereof.

9. A frame for bicycles and motor-cycles including a resilient frame member formed of a single continuous length of metal bent medially to V shape and at its ends engaging a steering head and a saddle and disposed with arms extending forwardly and rearwardly and by virtue of such disposition effective to sustain and absorb in substantial degree the shocks of travel under load, and a second frame member consisting of two parts clamped upon and by clamping integrated with the first frame member adjacent the bend of the V thereof.

In testimony whereof I hereunto affix my signature.

AMANDUS GLASER.